United States Patent [19]

Futamata

[11] Patent Number: 4,883,960

[45] Date of Patent: Nov. 28, 1989

[54] RADIATION-TYPE DIAGNOSIS APPARATUS

[75] Inventor: Shinichiro Futamata, Tochigi, Japan

[73] Assignee: Kabushiki Kaisha Toshiba, Kawasaki, Japan

[21] Appl. No.: 219,341

[22] Filed: Jul. 15, 1988

[30] Foreign Application Priority Data

Jul. 16, 1987 [JP] Japan ................................. 62-177405

[51] Int. Cl.$^4$ .............................................. G03C 5/16
[52] U.S. Cl. ................................ 250/327.2; 250/484.1
[58] Field of Search ............... 378/184, 185, 186, 181, 378/162, 165, 182; 250/327.2, 548, 561

[56] References Cited

U.S. PATENT DOCUMENTS

| | | | |
|---|---|---|---|
| 4,349,742 | 9/1982 | Flurry et al. | 250/548 |
| 4,629,891 | 12/1986 | Nakajima et al. | 250/327.2 |
| 4,663,528 | 5/1987 | Fujiwara et al. | 378/173 |
| 4,672,184 | 6/1987 | Jujiwara et al. | 235/462 |
| 4,712,228 | 12/1987 | Johnson et al. | 378/185 |
| 4,733,307 | 3/1988 | Watanabe | 455/103 |
| 4,760,259 | 7/1988 | Watanabe | 250/327.2 |
| 4,791,282 | 12/1988 | Schmidt et al. | 378/181 |

Primary Examiner—Janice A. Howell
Assistant Examiner—Jacob Eisenberg
Attorney, Agent, or Firm—Oblon, Spivak, McClelland, Maier & Neustadt

[57] ABSTRACT

In a radiation-type diagnosis apparatus, a plurality of imaging plates, each provided with bar codes, are received in a magazine and the magazine is set in a first storage section of the apparatus. In the first storage section, a photo detector for detecting the presence or absence of the bar code is located above the magazine to determine whether or not the imaging plate is positioned currently in the magazine. When the imaging plate is correctly located in the magazine, the imaging plate is transfer to a recording region in which an image of a region of interest is photographed.

8 Claims, 6 Drawing Sheets

RADIATION-TYPE DIAGNOSIS APPARATUS

BACKGROUND OF THE INVENTION

1. Field of the Invention

The present invention relates to a radiation-type diagnosis apparatus wherein a storage phosphor sheet is used as a medium for receiving the radiation passing through a region within a subject and recording the image of this region, along with a bar code identifying the sheet, and more particularly to a diagnosis apparatus wherein image data is prevented automatically from being read from a storage phosphor sheet when the sheet takes any position other than a desired one within the apparatus.

2. Description of the Related Art

The storage phosphor sheet is generally known as "imaging plate". The imaging plate is made of a phosphor which absorbs part of the energy of the radiation applied to it, such as X rays, $\alpha$ rays, $\beta$ rays, or $\gamma$ rays. When the imaging plate is scanned with excitation light such as visible light, the plate releases the energy in the form of light.

A method has been proposed and practically used, in which the radiation passing through a region of interest (hereinafter referred to as ROI) of a patient or other subject is applied to the imaging plate. The plate absorbs part of the energy of the radiation, thereby recording the image of this ROI. Whenever required, the imaging plate is scanned with an excitation light beam. As a result, the plate releases the energy in the form of light. A photoelectric device converts this light into image data. A data-processing apparatus process the image data, thus reproducing the image of the ROI. The reproduced image is either printed on a sheet of paper, or displayed by a CRT display.

In the above method of recording and reproducing the image of a ROI of interest, the imaging plate can be repeatedly used, about 1,000 times. The plate is, therefore, an economical recording medium. Actually, the imaging plate is used in various types of radiation-type diagnosis apparatuses.

One of these diagnosis apparatuses is cassette-less X-ray photography apparatus 202 shown in FIG. 1. Also shown in FIG. 1 is image-reading apparatus 200. Image-reading apparatus 200 has a storage section storing a number of imaging plates 201 which are not unrecorded. Bar codes are printed or labeled on the back of each plate 201. The bar code represents the ID number of the imaging plate, and also the conditions under which the image of a ROI should be photographed. One of plates 201 is pulled out from the storage section and inserted into cassette-less X-ray photography apparatus 202. Then, X-ray photography apparatus 202 is operated, thereby recording the image of a ROI of a patient on imaging plate 201. Apparatus 202 reads the data representing the image from plate 201, and also data items representing the ID number and the photographing conditions from the bar code, and transfers the image data and also the data items to image-reading apparatus 200 through a data transfer line (not shown). As is illustrated in FIG. 2, imaging plate 202 is removed from X-ray photography apparatus 202 and stored in the storage section of image-reading apparatus 200.

X-ray photography apparatus 202 performs the same image-recording/reproducing operation on the other imaging plates 201 supplied from image-reading apparatus 200 and inserted into it, one after another. These plates 201 are also stored in the storage section of apparatus 200.

When required, image-reading apparatus 200 is operated, thereby reading the image data from any one of imaging plates 201. Apparatus 200 also reads the ID number and the photographing conditions from the bar code printed or labeled on the back of the plate. The ID number, thus read, will be used as reference data in reading the image data from plate 201 over again, and the photography conditions, thus read, will be used in examining the image of the ROI to make an accurate diagnosis. The data items showing the ID number and the photography condition are supplied to an external data-processing system (not shown), together with the image data.

Each imaging plate 201, which has bar codes printed or labeled on its back, is usually a flat square plate. Hence, there is the possibility that plate 201 is positioned erroneously within X-ray photography apparatus 202 or within image-reading apparatus 200. When plate 210 is positioned erroneously in apparatus 202, the ID number cannot be read from the bar code, and the image recorded on plate 201 cannot be identified. When it is erroneously positioned in image-reading apparatus 200, neither the ID number nor the photography conditions can be read from bar code. Consequently, the image of the ROI, even if reproduced from plate 201, cannot be identified, and the conditions, under which the ROI has been photographed, cannot be ascertained. As a result of this, the ROI cannot be diagnosed a accurately.

More specifically, if unrecorded imaging plate 201 is appropriately placed in tray 300 as is shown in FIG. 3, with two bar codes 302A and 302B positioned correctly, the ID number of plate 201 will be read from either bar code when tray 300 is inserted into X-ray photography apparatus 202 or into image-reading apparatus 200. However, if plate 201 is erroneously placed in tray 300, the ID number can not be read from bar code 302A o 302B. The image of the ROI cannot be identified. Neither can be conditions, under which the ROI has been photographed, be ascertained. As a result, the ROI cannot be diagnosed accurately.

SUMMARY OF THE INVENTION

The object of the present invention is to provide a radiation-type diagnosis apparatus which can detect the position of a storage phosphor sheet used as a recording medium, and can read data correctly from the bar code printed or labeled on the storage phosphor sheet.

According to this invention there is provided a radiation-type diagnosis apparatus which comprises:

radiation-generating means for generating radiation;

support means for supporting an object and defining a recording region;

first storage means for storing a number of recording sheets;

sheet-supplying means for supplying the recording sheets, one by one, from the first storage means to the recording region;

second storage means for storing the recording sheets exposed to the radiation in the recording region;

bar code-reading means located within the second storage means, for reading data from a bar code formed on each of the recording sheets; and position-detecting means incorporated within the first storage means, for detecting the presence or absence of a bar code o each recording sheet stored in the first storage means, thereby to determine whether or not the recording sheet is positioned correctly in the first storage means, wherein the recording sheet held in the recording region is exposed to the radiation passing through a region of interest of the object, an image of the region of interest is thereby photographed on the recording sheet, the recording sheet is scanned with a light beam, thereby reproducing the image of the region of interest, and the reproduced image and the data read from the bar code are used in diagnosing the region of interest.

Further, according to the present invention, there is provided a radiation-type diagnosis apparatus which comprises:

first storage means for storing a number of recording sheets on which images of the regions of interest of objects are recorded;

sheet-supplying means for supplying the recording sheets, one by one, from the first storage means to an image-reproducing position;

image pick-up means for applying a light beam to the recording sheet located at the image-reproducing position, thereby to pick up a visible image from the recording sheet;

second storage means for storing the recording sheets from which images have been picked up at the image-reproducing position;

bar code-reading means located above the image-producing position, for reading data from a bar code formed on the recording sheet located at the image-reproducing position; and position-detecting means incorporated within the first storage means, for detecting the presence or absence of a bar code on each recording sheet stored in the first storage means, thereby to determine whether or not the recording sheet is positioned correctly in the first storage means, wherein the recording sheet held in the image-reproducing position is exposed to the radiation passing through a region of interest of the object, an image of the region of interest is thereby photographed on the recording sheet, the image pick-up means scans the recording sheet with a light beam, thereby reproducing the image of the region of interest, and the reproduced image and the data read from the bar code are used in diagnosing the region of interest.

DETAILED DESCRIPTION OF THE PREFERRED EMBODIMENTS

Figure 4:
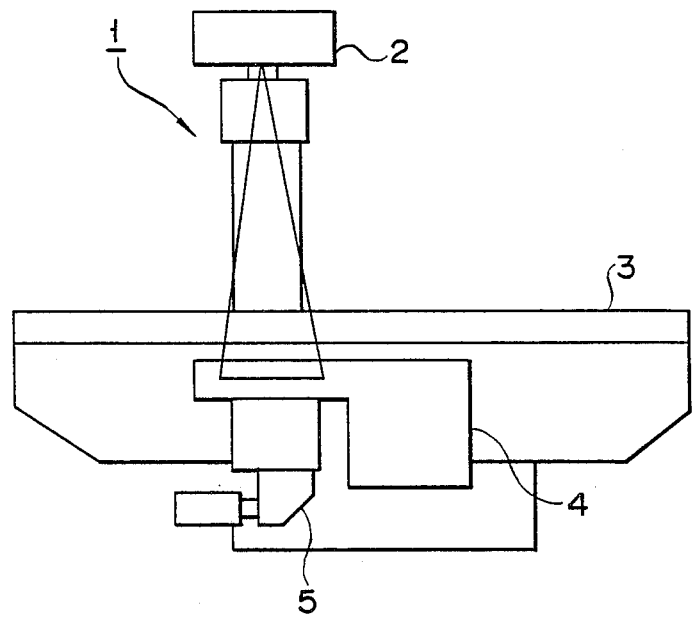
FIG. 4 is a side view illustrating a conventional X-ray photography apparatus.

Such a radiation-type diagnosis apparatus 1 as is shown in FIG. 4 is disclosed in U.S. Pat. 4,659,929, U.S. Pat. 4,667,102, and U.S. Pat. 4,663,528. As is illustrated in FIG. 4, the apparatus comprises X-ray tube 2, bed 3, spot-shot mechanism 4, and imaging system 5. X-ray tube 2 radiates X-rays onto patient lying on bed 3 located below X-ray tube 2. Spot-shot mechanism 4 is located below bed 3, and includes a mechanism for moving an imaging plate. Imaging system 5 contains an image intensifier for detecting the X rays which have passed through a region of interest (ROI) of the patient.

In order to display the image of the ROI by means of a display (not shown), X-ray tube 2 applies X rays having a relatively low intensity to the ROI, and the image intensifier detects the X rays passed through the ROI of the patient. On the other hand, to record the image of the ROI on an imaging plate, spot-shot mechanism 4 moves the imaging plate to a photographing position, and X-ray tube 2 is then operated, thereby applying X rays having a relatively high intensity to the ROI. In this case, the X-rays, which have passed through the ROI are applied to the plate, whereby the image of the ROI is recorded on the imaging plate.

Figure 5:
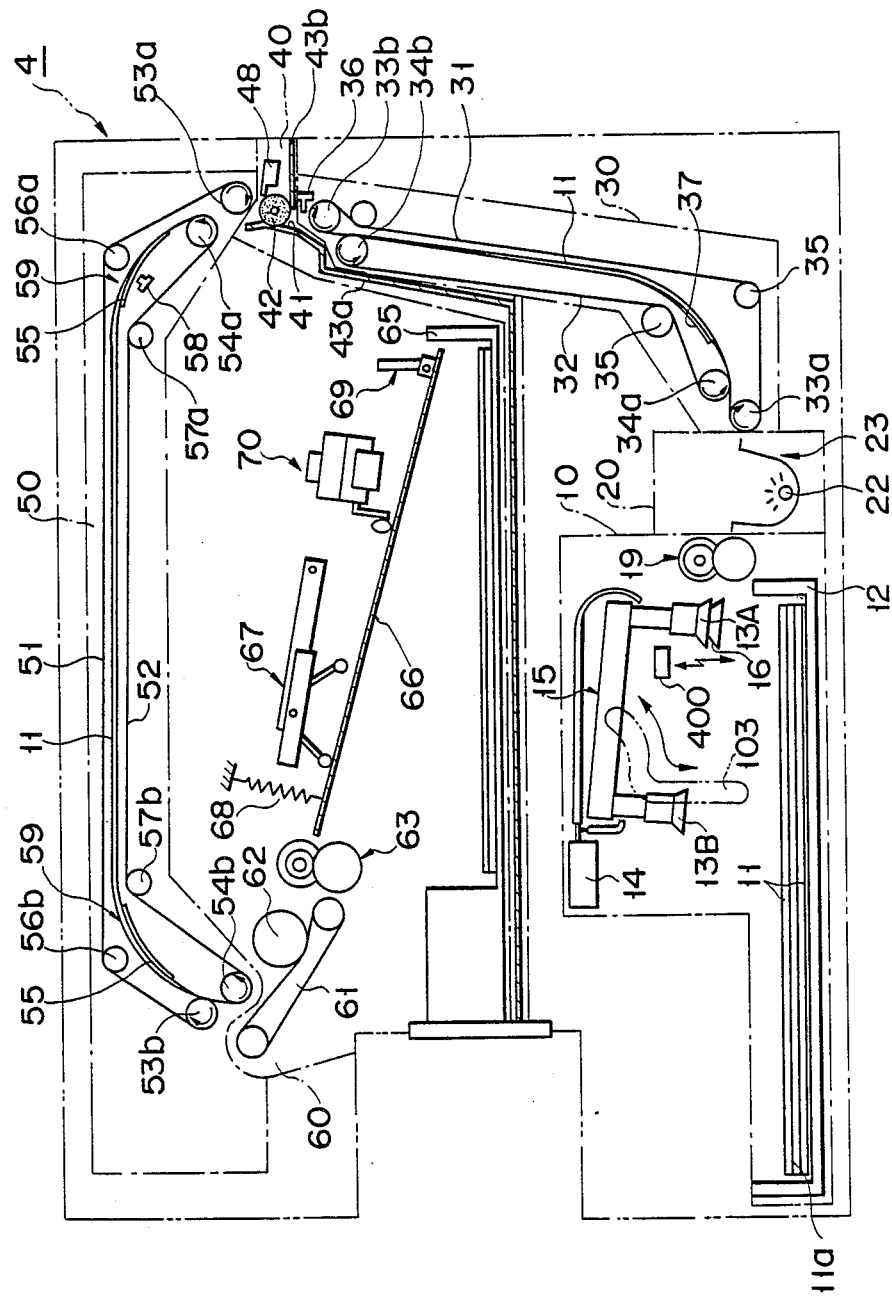
FIG. 5 is a cross-sectional view, showing the internal structure of an X-ray photography apparatus according to one embodiment of the present invention.

As is illustrated in FIG. 5, spot-shot mechanism 4 comprises first storage section 10, image-erasing section 20, transporting section 30, light-shielding section 40, holder section 50, and second storage section 60. First storage section 10 stores a number of imaging plates 11. These imaging plates 11 are supplied, one by one, to erasing section 20. Section 20 has lamp 22, and the light emitted by lamp 22 is applied to plate 11, thereby erasing a residual image, if any, from each imaging plate 11. Plate 11 is supplied from image-erasing section 20 to transporting section 30. Transporting section 30 transports imaging plate 11 to holder section 50 via light-shielding section 40. Section 40 is interposed between sections 30 and 50 and prevents the light emitted from lamp 22, from leaking into holder section 50 or into second storage section 60. Holder section 50 holds and moves imaging plate 11 perpendicularly to the plane of the drawing (FIG. 5), to a photographing position. The image of the ROI is recorded on plate 11. The recorded plate 11 is moved from holder section 50 and stored into second storage section 60.

Feed magazine 12 is set in first storage section 10. This magazine 12 contains a stack of imaging plates. Plate-feeding mechanism 15 is incorporated in first storage section 10. Mechanism 15 is comprised of a pair of suction units 13A and 13B and vacuum pump 14 connected to theses suction units. A pair of rollers 19 are also incorporated in first storage section 10, for supplying each image plate 11 from plate-feeding mechanism 15 to image-erasing section 20. Every time vacuum pump 14 is operated, the uppermost plate 11 is attracted to suction units 13A and 13B. Both units 13A and 13B are moved in the horizontal direction until one edge of plate 11 is caught in the gap between rollers 19. Rollers 19 are driven by a motor or the like (not shown), whereby plate 11 is fed from first storage section 10 to noise-erasing section 20.

As is shown in FIG. 5, reflective photosensor 400 is provided within first storage section 10. Photosensor 400 comprises a light-emitting element and a light-receiving element (neither shown). Photosensor 400 is positioned such that the bar code 11A o 11B labeled on the uppermost plate 11 is irradiated with the light beam emitted from the light-emitting element when imaging plate 11 is positioned correctly. Thus, when plate 11 takes an incorrect position in magazine 12, the other surface region of plate 11 is irradiated with the light beam. The other surface region has reflectivity smaller than bar codes 11A and 11B. Therefore, the light beam reflected from bar code 11A or 11B is more intense than the beam reflected from this surface region. The light-receiving element of photosensor 400 converts the light beam reflected from imaging plate 11 into an electric signal.

Figure 6:
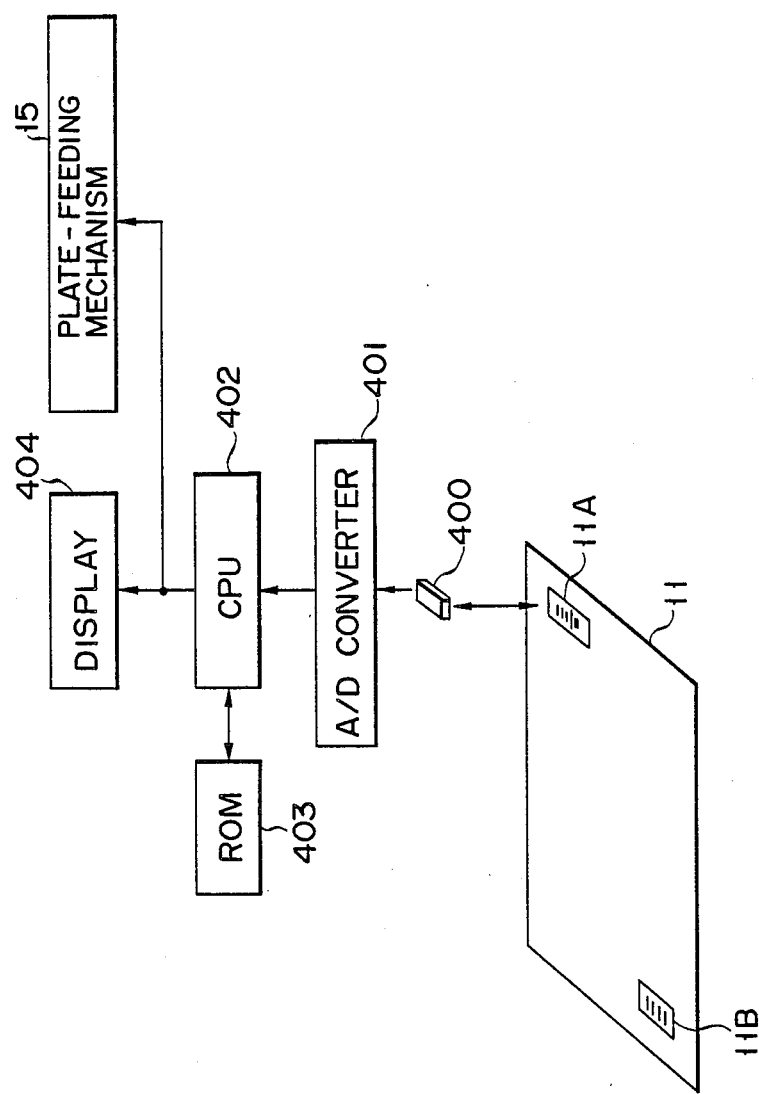
FIG. 6 is a block diagram showing the circuit incorporated in the apparatus shown in FIG. 4, for detecting a bar code labeled on a imaging plate.

As is illustrated in FIG. 6, photosensor 400 is connected to A/D converter 401, which in turn is coupled to CPU 402. ROM 403 and display 404 are connected to CPU 402. Plate-feeding mechanism 14 is also connected to CPU 402. The signal output by photosensor 400 is input to A/D converter 401. Converter 401 converts the signal into digital data. The digital data is supplied to CPU 402. ROM 403 compares the digital data with the digital data stored in ROM 403 and representing a reference intensity which is similar to the intensity of the light beam reflected from bar code 11A or 11B. When the digital data output by A/D converter 401 is smaller than the digital data stored in ROM 403, that is, when imaging plate 11 is positioned erroneously in magazine 12, CPU 402 supplies an alarm signal to display 404, and also to plate-feeding mechanism 15. In response to the alarm signal, display 404 displays an alarm. Simultaneously, plate-feeding mechanism 15 is deenergized, and plate 11 is not fed to image-erasing section 20. Seeing the alarm displayed by display 404, the operator positions plate 11 correctly in magazine 12. On the other hand, when the digital data output by A/D converter 401 is equal to or larger than the digital data stored in ROM 403, that is, when imaging plate 11 is positioned correctly in magazine 12, CPU 402 supplies no alarm signals to display 404 or plate-feeding mechanism 15. Hence, mechanism 15 feeds imaging plate 11 to image-erasing section 20.

As has been described, noise-erasing section has lamp 22. Lamp 22 is turned on every time an imaging plate enters section 20. It applies light to the plate, thereby erasing the residual image from imaging plate 11.

Imaging plate 11 is supplied to transporting section 30. Section 30 comprises two belts 31 and 32, each driven by a motor (not shown), and sensor 36 at the outlet of section 30. Belts 31 and 32 extend vertically and parallel to each other. They hold plate 11 between them, and transport it forward as they are driven by the motors. When plate 11 reaches the outlet of section 30, it is detected by sensor 36. Upon detecting imaging plate 11, sensor 36 outputs a signal. This signal is supplied to a first motor controller (not shown). In response to the signal, the first motor controller stops the motors. As a result of this, both belts 31 and 32 stop running, and plate 11 is halted at the outlet of transporting section 30.

Light-shielding section 40 comprises guide 41 and light-shielding roller 42. Roller 42 rolls on guide 41 in such a way that it prevents the light emitted from image-erasing section 20 from leaking into second transporting section 50 and second storage section 60.

Figure 7:
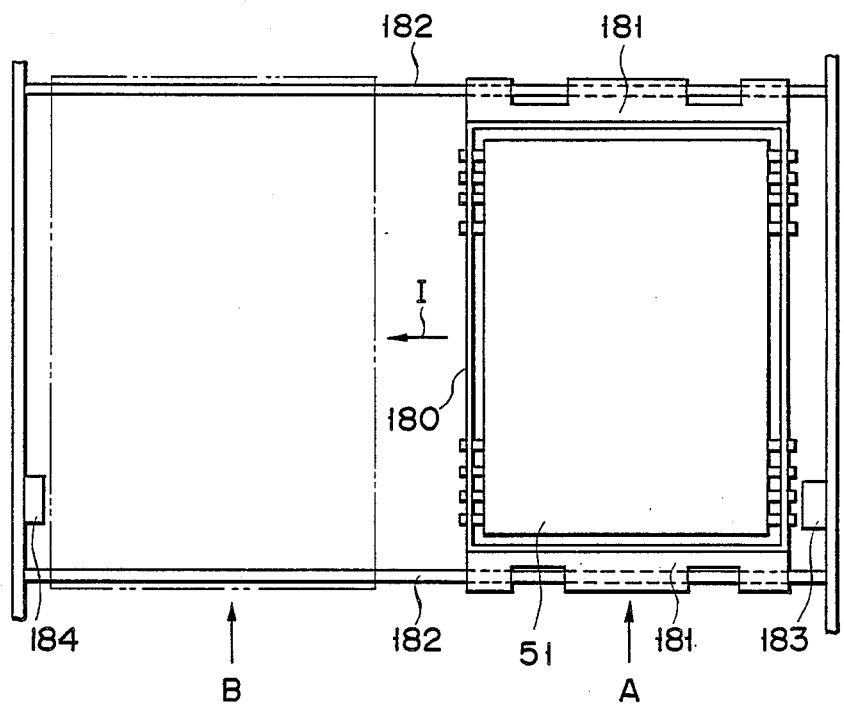
FIG. 7 is a plan view of the X-ray photography apparatus shown in FIG. 5.

Holder section 50 has two belts 51 and 52, each driven by a motor (not shown), and sensor 58. Both belts 51 and 53 extend horizontally, belt 51 located above belt 52, thus forming a plate-transporting path. Sensor 58 is provided in the inlet portion of this plate-transporting path. When sensor 58 detects no imaging plates, a signal showing this fact is supplied to the first motor controller. In response to this signal, the first motor controller causes the motors to drive belts 31 and 32 of first transporting section 30. Imaging plate 11 is, therefore, transported to holder section 50 through light-shielding section 40. When the forward end of plate 11 reaches the inlet portion of section 50 and is thus detected by sensor 58, sensor 58 generates a signal. The signal is supplied to the first motor controller. In response to the signal, the first motor controller stops the motors, whereby belts 31 and 32 are stopped. Imaging plate is halted at standby position A shown in FIG. 7. When no imaging plates are found in the photographing position B (FIG. 7), a signal showing this fact is supplied to a second motor controller (not shown) for controlling the motors which drive belts 51 and 52 of holder section 50. In response to this signal, the second motor controller causes the motors to drive belts 51 and 52. As a result, as is shown in FIG. 7, holder section 50 is moved from standby position A to photographing position B in the direction of arrow I along parallel guide rails 182. This movement of holder section 50, and hence, the movement of imaging plate 11, from position A to position B is detected by limit switch 184.

Photographing position B is right below bed 3 (FIG. 4) which is located right below X-ray tube 2 (FIG. 4). Hence, imaging plate 11 at position B is exposed to the X rays emitted from X-ray tube 2 and passing through the ROI of the patient lying on bed 3. The X-ray image of the ROI is recorded on plate 11. Upon completion of this recording of image, holder section 50 is returned from photographing position B to standby position A. This return of section 50 is detected by limit switch 183. Imaging plate 11 is then transported from holder section 50 to second storage section 60 by means of belts 51 and 52 of holder section 50.

Limit switches 183 and 184, which detect the movement of holder section 50, can be replaced by a rotary encoder which detects the rotation of the motor (not shown) for moving holder section 50.

As is shown in FIG. 5, second storage section 60 has belt 61 for transporting recorded plate 11, roller 62, feeding mechanism 63, magazine 65, holding plate 66, and holding mechanism 67. Belt 61 is driven by a motor (not shown), and roller 62 contacts belt 61. Recorded plate 11 transported by belts 51 and 52 of holder section 50 is moved forward by belt 61 and roller 62 to feeding mechanism 63 which comprises a pair of rollers. Feeding mechanism 63 feeds plate 11 into magazine 65. Holding plate 66 is located above magazine 65. Every time recorded plate 11 is fed into magazine 65, holding mechanism 67 rotates holding plate 66 downwardly around one end thereof, thus placing recorded plate 11 appropriately in magazine 65. A bar code reader (not shown) is located above magazine 65, for reading data from the bar code labeled on uppermost plate 11 stored in magazine 65. This data is transferred to image-reading apparatus 200 (FIG. 1) through a data-transfer line (not shown).

Figure 2:
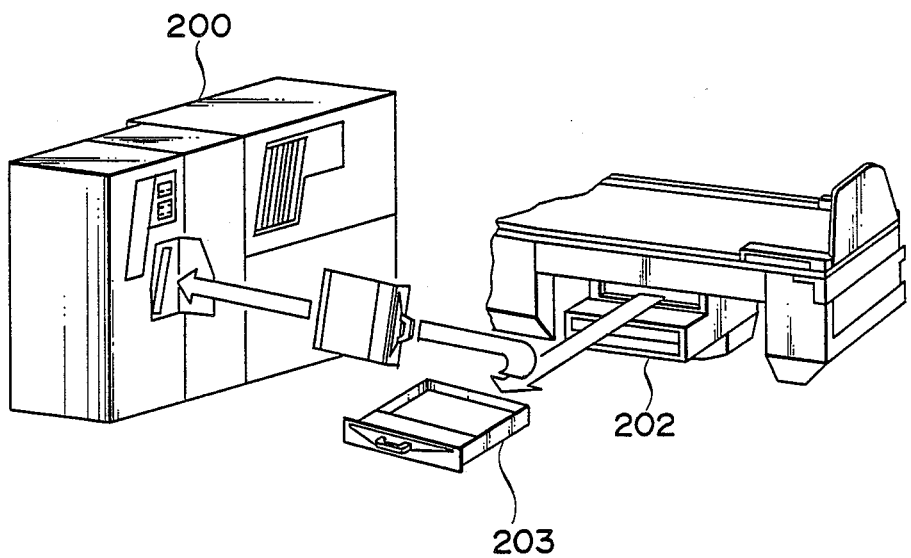
Figure 3:
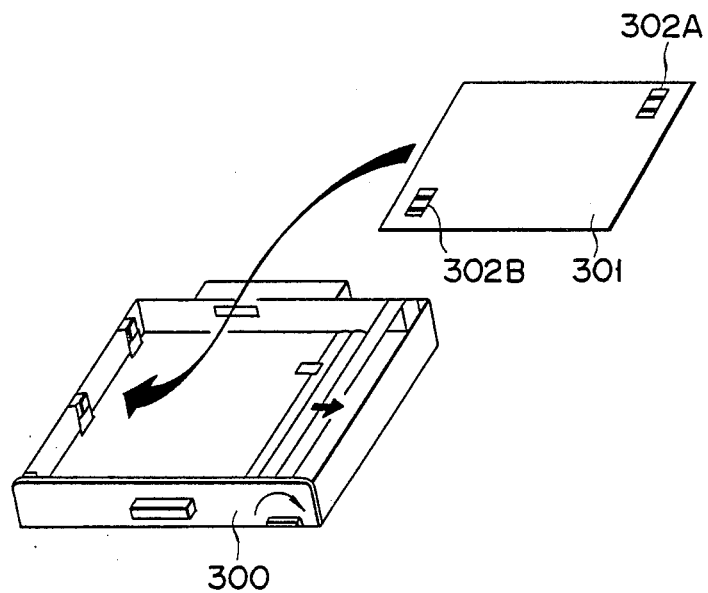
FIG. 3 is a perspective view showing an imaging plate, and also a tray supporting the imaging plate.
Figure 8:
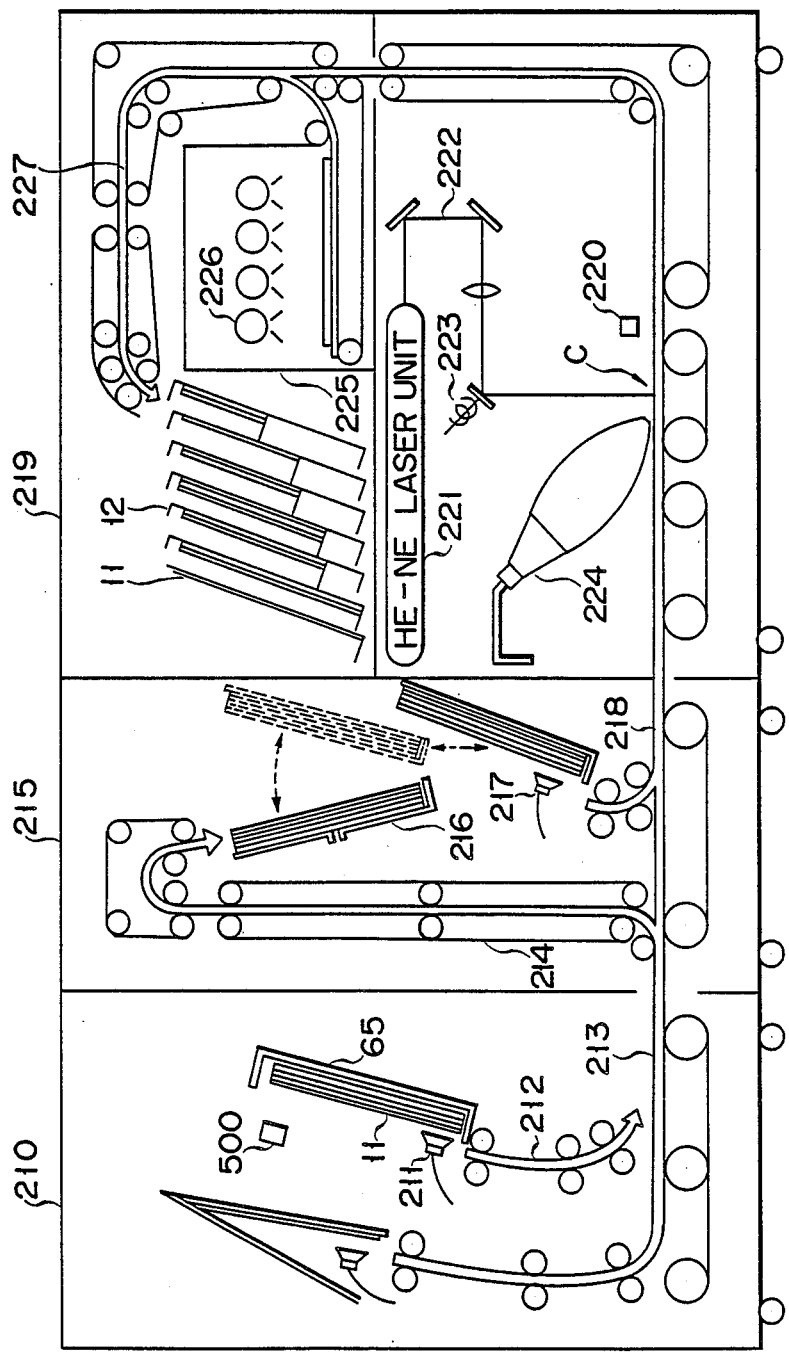
FIG. 8 is a cross-sectional view, illustrating the internal structure of an image-reading apparatus according to the present invention.

When necessary, magazine 65 storing a stack of recorded plates 11 is pulled from X-ray photographing apparatus 202, as is illustrated in FIG. 2. As is shown in FIG. 8, image-reading apparatus 200 comprises cassette magazine feeder 210, stacker unit 215, and image-reading unit 219. Magazine 65 is inserted into cassette magazine feeder 210. Cassette magazine feeder has photosensor 500 of the same design as photosensor 400 shown in FIG. 5. Photosensor 500 detects whether or not the uppermost imaging plate 11 is positioned correctly in magazine 65. If the uppermost plate takes an erroneous position, an alarm device of the same design as shown in FIG. 6 displays an alarm in accordance with the output signal of photosensor 500. If the uppermost plate 11 is position correctly, it is removed from magazine 65 by means of plate-feeding unit 211, and is fed to stacker 216 incorporated in stacker unit 215 by conveyor 212 provided in cassette magazine feeder 210 and also by conveyor 214 provided in stacker unit 215.

To read image from recorded imaging plate 11, plate-feeding unit 217, which is incorporated in stacker unit 215, transports plate 11 to the image-reading position C in image-reading unit 219, through conveyor belt 218. When imaging plate 11 is set at the image-reading position C, bar code reader 220 provided in unit 219 reads the ID number from the bar code labeled on plate 11. In accordance with the ID number, the data, which has been read from the bar code, represents the conditions of photographing the ROI, and has been transferred from X-ray photographing apparatus 202, is retrieved from the data storage (not shown) incorporated within image-reading apparatus 200. This image data is used as a reference in reading the image from recorded plate 11. More specifically, in accordance with this data laser beam emitted from He—Ne laser unit 221 is controlled. The laser beam is applied via optical system 222 to deflector 223. Deflector 223 deflects the laser beam toward imaging plate 11 located at image-reading position C. In other words, plate 11 is scanned with the laser beam. Plate 11 is excited by the laser beam, and emits light, thus rendering the recorded image visible. The visible image, or the light rays being emitted from imaging plate 11 are applied to a photosensor (not shown). This photosensor converts the light rays into electric signals. These electric signals are supplied, as image data, to an image data-processing system (not shown).

Figure 1:
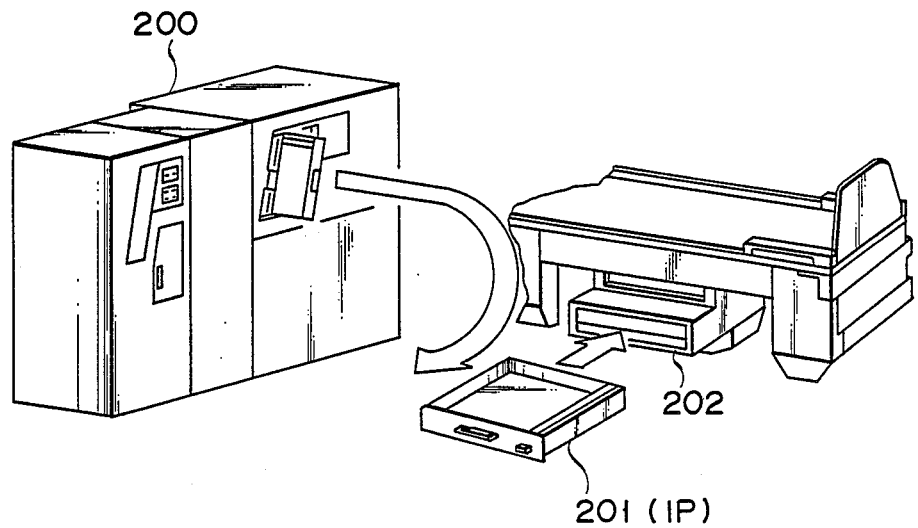
FIGS. 1 and 2 are perspective views, each showing a conventional image-reading apparatus and a conventional X-ray photography apparatus.

After the image has been read from imaging plate 11, plate 11 is transported into erasing unit 225 incorporated in image-reading unit 219 by means of conveyor belt 218. Erasing lamp 226 provided in unit 225 applies light rays to imaging plate 11, thereby erasing the image from plate 11. Erased plate 11 is supplied by conveyor belt 227 to tray 12 which is located in image-reading unit 219. When required, tray 12 is inserted into X-ray photographing apparatus 202 as is shown in FIG. 1. Plates 11 stored in tray 12 will be used again to record images of ROIs of patients.

As has been described above, it is determined whether or not each imaging plate 11 is positioned correctly before it is used to record an image or before the image is read from it. If it is determined that plate 11 takes an erroneous position, then the plate can be positioned correctly. Hence, the ID information, which is required for accurately diagnosing a patient from the image recorded on plate 11, can be read from the bar code labeled on imaging plate 11. Further, the data representing the condition under which the image of a ROI should be photographed can be read from the bar code, too, so that this data may be used in photographing the ROI and in reproducing the image of the ROI from plate 11.

What is claimed is:

1. A radiation-type diagnosis apparatus wherein a recording sheet is used for receiving the radiation passing through a region of interest of an object and photographing the image of this region, along with a bar code identifying the recording sheet, said diagnosis apparatus comprising:
   radiation-generating means for generating radiation;
   support means for supporting a subject and defining a recording region;
   first storage means for storing a number of recording sheets;
   sheet-supplying means for supplying said recording sheets, one by one, from said the first storage means to said recording region;
   second storage means for storing the recording sheets exposed to the radiation in said recording region;
   bar code-reading means located within said second storage means, for reading data from the bar code provided on each of the recording sheets; and
   position-detecting means incorporated within said first storage means, for detecting the presence or absence of a bar code on each recording sheet stored in said first storage means, thereby to determine whether or not the recording sheet is positioned correctly in said first storage means,
   wherein the recording sheet held in said recording region is exposed to the radiation passing through a region of interest of the object, an image of the region of interest is thereby photographed on the recording sheet, the recording sheet is scanned with a light beam, thereby reproducing the image of the region of interest, and the reproduced image and the data read from the bar code are used in diagnosing the region of interest.

2. The apparatus according to claim 1, wherein said position-detecting means generates an alarm signal when the recording sheet is not positioned correctly in said first storage means, and includes alarm means for giving forth an alarm in response to the alarm signal.

3. The apparatus according to claim 1, wherein said position-detecting means generates an alarm signal when the recording sheet is not positioned correctly in said first storage means, and includes means for deenergizing, transport means for transporting means, in response to the alarm signal.

4. The apparatus according to claim 1, wherein said two bar codes are labeled on diagonally oppositing two corners of the recording sheet.

5. A radiation-type diagnosis apparatus wherein a recording sheet is used for receiving the radiation passing through a region of interest of an object and recording the image of this region, along with a bar code identifying the recording sheet, said diagnosis apparatus comprising:
   first storage means for storing a number of recording sheets on which images of the regions of interest of objects are recorded;
   sheet-supplying means for supplying the recording sheets, one by one, from the first storage means to an image-reproducing position;
   image pick-up means for applying a light beam to the recording sheet located at the image-reproducing position, thereby to pick up a visible image from the recording sheet;
   second storage means for storing the recording sheets from which images have been picked up at the image-reproducing position;
   bar code-reading means located above the image-reproducing position, for reading data from a bar code formed on the recording sheet located at the image-reproducing position; and position-detecting means incorporated within the first storage means, for detecting the presence or absence of the bar code on each recording sheet stored in the first storage means, thereby to determine whether or not the recording sheet is positioned correctly in the first storage means, wherein the recording sheet held in the image-reproducing position is exposed to the radiation passing through a region of interest of the object, an image of the region of interest is thereby photographed on the recording sheet, the image pick-up means scans the recording sheet with a light beam, thereby reproducing the image of the region of interest, and the reproduced image and the data read from the bar code are used in diagnosing the region of interest.

6. The apparatus according to claim 5, wherein said position-detecting means generates an alarm signal when the recording sheet is not positioned correctly in said first storage means, and includes alarm means for giving forth an alarm in response to the alarm signal.

7. The apparatus according to claim 5, wherein said position-detecting means generates an alarm signal when the recording sheet is not positioned correctly in said first storage means, and includes means for deenergizing, transport means for transporting means, in response to the alarm signal.

8. The apparatus according to claim 5, wherein said two bar codes are labeled on diagonally oppositing two corners of the recording sheet.

* * * * *